A. CARLBORG AND G. NYMAN.
SHAFT AND AXLE BEARING.
APPLICATION FILED JUNE 25, 1915. RENEWED SEPT. 29, 1919.
1,321,417. Patented Nov. 11, 1919.
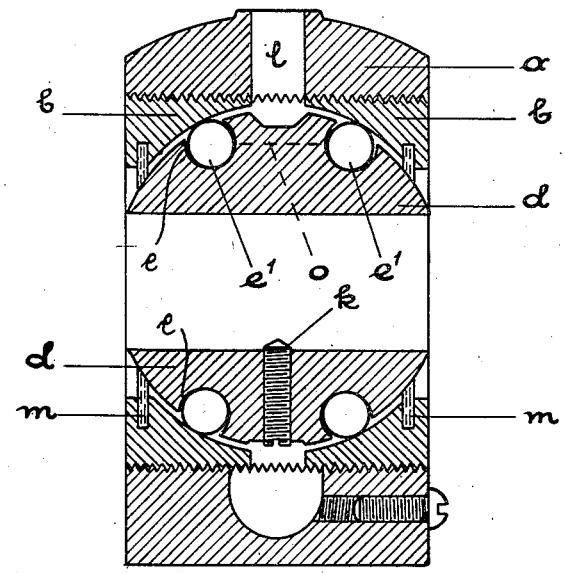
Witnesses.
Inventors:
August Carlborg
Gunnar Nyman.
by their Attorney

UNITED STATES PATENT OFFICE.

AUGUST CARLBORG AND GUNNAR NYMAN, OF TYKO, FINLAND.

SHAFT AND AXLE BEARING.

1,321,417.  Specification of Letters Patent.  Patented Nov. 11, 1919.

Application filed June 25, 1915, Serial No. 36,236. Renewed September 29, 1919. Serial No. 327,157.

*To all whom it may concern:*

Be it known that we, AUGUST CARLBORG and GUNNAR NYMAN, a subject of the King of Sweden and a subject of the Emperor of Russia, respectively, both residing at Tyko, in Finland, have invented certain new and useful Improvements in Shaft and Axle Bearings, of which the following is a specification.

Our invention relates to ball bearings for shafts and axles of the class wherein the balls run upon the spherical surface, so that they maintain even contact with the said surface when the shaft oscillates or rocks. The object of the invention is to provide improved means for rendering bearings of this class dust-tight in all positions of the shaft. To this end we use packing rings, which close the space containing the balls and bear against a spherical surface with which they maintain close contact when the shaft oscillates or rocks. The surface against which the rings bear may be a portion of the spherical surface upon which the balls run.

The invention is illustrated in the accompanying drawing, which shows one form of construction, in section.

In the drawing $a$ designates the eye of the bearing, which may be in one piece or in two pieces, and is internally screw-threaded for engagement with two externally screw threaded rings $b$, which form the shell of the ball bearing. These shell members can be axially adjusted in relation to each other by turning them in the eye $a$. The inner surfaces of the shell members are turned to form complementary segments of a sphere, within which lies the spherical journal member $d$. The latter has a bore for the shaft, and also has two or more channels or races $e$ for balls $e^1$, which protrude from the channels and support the journal and shaft in the shell. The depth of the channels exceeds the radius of the balls, and their rims converge, so that they embrace and retain the balls. The sphericity of the shell enables the balls to remain in even contact with the same when the shaft rocks or bends. To enable the balls to be inserted into the channels $e$ the member $d$ has a removable part or slide $o$, enabling an aperture to be uncovered, through which the balls can be dropped into the channels.

The journal member $d$, being spherical, allows the shaft to rock, oscillate or bend without increase of friction in the bearing, and two flexible rings $m$ of felt, leather or other suitable material are fitted into the shell, making contact with the journal member and evenly maintaining this contact in all positions of the shaft. These rings $m$ form effective dust-guards for the interior of the bearing. The shell pieces $b$ may be made fast in the eye $a$ by means of lock screws. A set screw $k$ in the member $d$ serves to fix this member to the shaft. The eye $a$ has a hole $l$ through which a cotter can be inserted into a hole in the member $d$ in order to temporarily prevent rotation of the latter, if required for any purpose. This hole can also be used for lubrication.

What we claim as our invention and desire to secure by Letters Patent of the United States is:—

1. In a ball bearing the combination of an outer member and an inner member which are capable of assuming variable relative angular positions of their axes to one another about a center of oscillation, and one of which is rotatable with respect to the other; one of said members having an uninterrupted surface in the form of a portion of a sphere whose center is the said center of oscillation, and the other member comprising a recessed track for the reception of balls; a plurality of balls in said track, and packing rings having circumferential surfaces in contact with said last mentioned member one on each side of the recessed track; the contacting surfaces of said packing rings lying in a sphere concentric with the spherical surface aforesaid, and the circle tangent exteriorly to said balls lying in a sphere concentric and co-radial with said spherical surface.

2. In a ball bearing the combination of a fixed shell member having a spherical inner surface, a journal member in said shell having a spherical outer surface, spaced apart from said shell, packing rings projecting from one of said members and making contact with the spherical surface of the other member, and balls between said rings.

3. In a ball bearing the combination of an internally screw threaded eye, two bearing members, one within the other, the outer bearing member consisting of two complementary parts screwed into said eye, and one of said bearing members having a spherical surface, balls between said bearing members, and packing rings closing the space containing said balls, bearing against the member having the spherical surface and fixed to the other bearing member.

4. In a ball bearing, the combination, with an outer member having a spherical inner surface, an inner member within the outer member having a spherical outer surface, and a set of balls between said members; of a pair of packing rings, one on each side of the balls, fixed to one of said members and having circumferential surfaces which contact directly with the spherical surface of the other member and conform to the sphericity of such surface.

In witness whereof we have signed this specification in the presence of two witnesses.

AUGUST CARLBORG.
GUNNAR NYMAN.

Witnesses:
 HUM ANDEREF,
 A. MELLIN